(12) United States Patent
Okuda (10) Patent No.: US 10,345,615 B2
(45) Date of Patent: Jul. 9, 2019

(54) OPTICAL CONTROL APPARATUS, OPTICAL APPARATUS, AND STORAGE MEDIUM FOR STORING OPTICAL CONTROL PROGRAM

(71) Applicant: CANON KABUSHIKI KAISHA, Tokyo (JP)

(72) Inventor: Toshihiro Okuda, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 76 days.

(21) Appl. No.: 15/388,529

(22) Filed: Dec. 22, 2016

(65) Prior Publication Data

US 2017/0192247 A1 Jul. 6, 2017

(30) Foreign Application Priority Data

Jan. 6, 2016 (JP) ................................. 2016-000943

(51) Int. Cl.
  *G02B 27/64* (2006.01)
  *G02B 7/08* (2006.01)
  *G03B 5/06* (2006.01)
  *H04N 5/232* (2006.01)

(52) U.S. Cl.
  CPC ............. *G02B 27/646* (2013.01); *G02B 7/08* (2013.01); *G03B 5/06* (2013.01); *H04N 5/23209* (2013.01); *H04N 5/23212* (2013.01); *H04N 5/23258* (2013.01); *H04N 5/23287* (2013.01)

(58) Field of Classification Search
  CPC ........ G02B 27/64; G02B 27/646; G02B 7/00; G02B 7/04; G02B 7/09; G02B 7/10; G02B 7/105; G02B 7/02; G02B 7/021; G02B 7/28; H04N 5/228; H04N 5/232
  See application file for complete search history.

(56) References Cited

U.S. PATENT DOCUMENTS

| | | | |
|---|---|---|---|
| 5,617,159 A * | 4/1997 | Sakagami | G02B 27/646 348/E5.046 |
| 5,698,841 A | 12/1997 | Momoki | |
| 2007/0008415 A1* | 1/2007 | Higo | G03B 5/00 348/208.11 |
| 2010/0209097 A1* | 8/2010 | Sasaki | G03B 17/14 396/529 |

(Continued)

FOREIGN PATENT DOCUMENTS

JP 200835308 A 2/2008

*Primary Examiner* — Thong Q Nguyen
(74) *Attorney, Agent, or Firm* — Rossi, Kimms & McDowell LLP (57) ABSTRACT

An optical control apparatus configured to control driving of a focus correction unit that moves for focusing along an optical axis of an optical system or a normal of an imaging surface, in imaging in which the optical axis tilts to the normal includes an acquirer configured to acquire tilt information on a tilt of the optical system, and a controller configured to control, as a shiftable unit is driven, the driving of the focus correction unit in accordance with the tilt information and vibration information on a vibration of the optical system or a shift drive amount of the shiftable unit, the shiftable unit being configured to shift in a direction orthogonal to the optical axis or a direction orthogonal to the normal in accordance with the vibration of the optical system for an image stabilization.

11 Claims, 6 Drawing Sheets

(56) References Cited

U.S. PATENT DOCUMENTS

| | | | |
|---|---|---|---|
| 2011/0032615 A1* | 2/2011 | Usui | G02B 27/646 |
| | | | 359/554 |
| 2011/0115929 A1* | 5/2011 | Noguchi | G03B 5/00 |
| | | | 348/208.4 |
| 2014/0211030 A1* | 7/2014 | Hideshima | G03B 5/00 |
| | | | 348/208.11 |
| 2015/0234198 A1 | 8/2015 | Hayakawa et al. | |

\* cited by examiner

OPTICAL CONTROL APPARATUS, OPTICAL APPARATUS, AND STORAGE MEDIUM FOR STORING OPTICAL CONTROL PROGRAM

BACKGROUND OF THE INVENTION

Field of the Invention

The present invention relates to control for reducing (correcting) an image blur (or for an image stabilization) in tilt imaging.

Description of the Related Art

As the tilt and shift photographing (tilt and shift imaging) using a single-lens reflex camera etc., the tilt imaging uses an optical system (imaging lens) having an optical axis tilted to a normal of an imaging surface. The tilt imaging can widen or narrow a depth of field (in-focus range). The image stabilization is necessary even in the tilt imaging similar to the normal imaging, due to a vibration of an optical system, such as a manual vibration (camera vibration). For the image stabilization, a shift lens (shift lens unit) as part of the optical system or an image sensor disposed on an imaging surface (which are collectively referred to as a "shiftable unit" hereinafter) may be shifted from the optical axis of the optical system or a normal (line) of the imaging surface.

Japanese Patent Laid-Open No. 2008-35308 discloses a tilt and shift photographing method configured to shift an image sensor by an amount necessary for the tilt and shift photographing and to provide an image stabilization by shifting the image sensor using a shifted position of the image sensor as a center in accordance with a camera vibration in shift imaging in the tilt and shift photographing.

An object surface (in-focus plane on the object side) is not parallel to the imaging surface in the tilt imaging. When the shiftable unit is shifted for the camera vibration in a direction parallel to the imaging surface, the image blur can be corrected but the defocus occurs.

SUMMARY OF THE INVENTION

The present invention provides an optical control apparatus, an optical apparatus, etc. which can reduce a defocus that would be caused by shifting a shiftable unit for an image stabilization in tilt imaging.

An optical control apparatus according to one aspect of the present invention configured to control driving of a focus correction unit that moves for focusing along an optical axis of an optical system or a normal of an imaging surface, in imaging in which the optical axis tilts to the normal includes an acquirer configured to acquire tilt information on a tilt of the optical system, and a controller configured to control, as a shiftable unit is driven, the driving of the focus correction unit in accordance with the tilt information and vibration information on a vibration of the optical system or a shift drive amount of the shiftable unit, the shiftable unit being configured to shift in a direction orthogonal to the optical axis or a direction orthogonal to the normal in accordance with the vibration of the optical system for an image stabilization.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
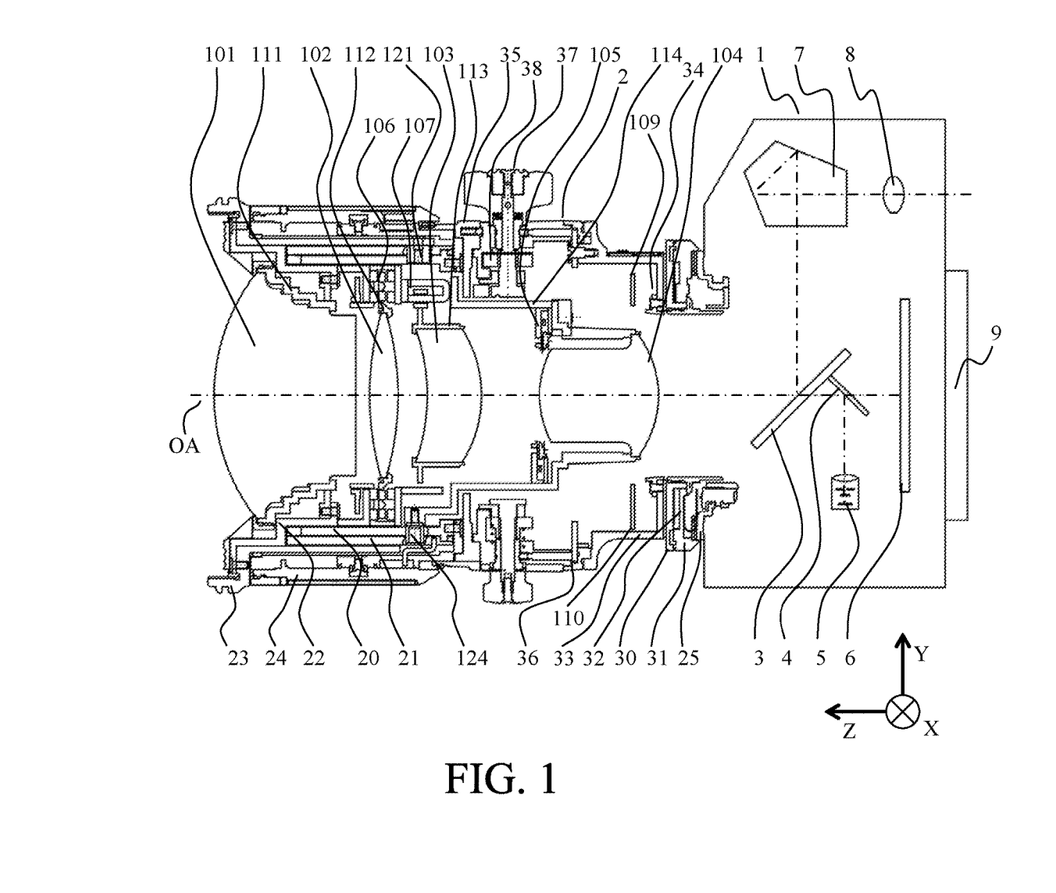
FIG. 1 is a sectional view illustrating configurations of an interchangeable lens and a camera according to a first embodiment of the present invention.

FIG. 1 illustrates a configuration of a single-lens reflex digital camera body (simply referred to as a "camera" hereinafter) 1 as an imaging apparatus and an interchangeable lens (optical apparatus) 2 attached to and detached from the camera 1. In FIG. 1, a Z direction is an optical axis direction along a lens optical axis (simply referred to as an "optical axis" hereinafter) OA, an X direction is a lateral direction among two directions parallel to the imaging surface orthogonal to the optical axis OA, and a Y direction is a longitudinal direction among the two directions. While this embodiment provides the interchangeable lens with the optical apparatus having a focus correction unit and a shiftable unit, which will be described later, the optical apparatus may be a lens integrated type imaging apparatus.

Next follows a description of the configuration of the camera 1. As illustrated in FIG. 1, a main mirror 3 disposed on the optical path of the light flux from the interchangeable lens 2 reflects part of the light flux to the viewfinder optical system (7, 8) and transmits the rest of the light flux. A sub mirror 4 disposed behind the main mirror 3 (on the imaging surface) reflects and leads to the focus detection unit 5 the light flux that has transmitted the main mirror 3. The main mirror 3 and the sub mirror 4 can be retreated from the optical path by an unillustrated drive mechanism.

A focus detection unit 5 detects a focus state of the interchangeable lens 2 by the phase difference detection method (or provides a focus detection). An image sensor 6 includes a CCD sensor or a CMOS sensor. An object image (optical image) is formed by the light flux from the interchangeable lens 2 on the light-receiving surface (imaging surface) of the image sensor 6. The image sensor 6 photoelectrically converts the object image and outputs an image signal. A display panel 9 displays an image generated by an unillustrated signal processor based on the image signal and various imaging related information.

In this embodiment, the camera 1 is a single-lens reflex camera including the main mirror 3, sub mirror 4, and the focus detection unit 5, but may be a so-called mirror less camera (non-reflex camera) having no main mirror 3, no sub mirror 4 or no focus detection unit 5. Instead of the focus detection unit 5, a focus detection based on the imaging surface phase difference detection method may be performed using the image signal from the image sensor 6. A focus detection may use the image signal obtained from the image sensor 6 in accordance with the contrast detection method.

The interchangeable lens 2 includes an imaging optical system. The imaging optical system includes, in order from the object side to the imaging surface side, a first lens unit 101, a second lens unit 102, a third lens unit 103, a stop unit 105, and a fourth lens unit 104. In the interchangeable lens 2, the first, second, and third lens units 101 to 103 move in the optical axis direction as a guide cylinder 20 and a cam cylinder 21, which will be described later rotate relatively to each other around the optical axis.

The first lens unit 101 is held by a first lens holding frame 111, and a second lens unit 102 is held by a second lens holding frame 112. The third lens unit 103 is held by a third lens holding frame 113, and a fourth lens unit 104 is held by a fourth lens holding frame 114.

The second lens unit (shiftable element, shiftable unit) 102 receives a drive force from a vibration-proof actuator 106, and is shifted in a plane orthogonal to the optical axis OA. The second lens unit 102 may be shifted and rotated around the axis that passes the optical axis OA. The third lens unit (focus correction element or focus correction unit) 103 as a focus correction lens (or focus lens, focus correction lens unit, focus lens unit) receives a drive force from a focus correction actuator (or focus actuator) 107, which will be descried later, moves in the optical axis direction, and corrects a defocus caused by a shift of the second lens unit 102.

The stop unit 105 adjusts a light quantity incident upon the camera 1. The stop unit 105 and the lens CPU 109 are electrically connected with each other via the unillustrated flexible printed substrate.

The vibration-proof actuator 106 is a voice coil motor that includes a magnet and a coil, and shifts the second lens unit 102 as the shift lens when receiving the thrust that occurs in the coil. The vibration-proof actuator 106 and the lens CPU 109 are electrically connected to an unillustrated flexible printed substrate.

The lens CPU 109 as the optical control apparatus includes an acquirer (acquisition means) and a controller. The acquirer acquires information from a vibration sensor 110, such as an angular detector, configured to detect a camera vibration amount (vibration amount information or the vibration amount of the imaging optical system). The controller calculates a shift drive amount for the second lens unit 102 in accordance with the camera vibration amount, and control the second lens unit 102.

The controller controls driving of the vibration-proof actuator 106 in accordance with the calculation result. This embodiment shifts the second lens unit 102 on the plane orthogonal to the optical axis OA, but the plane may incline to the optical axis OA. This embodiment shifts the shift lens as part of the imaging optical system, but may shift the image sensor 6 on a plane orthogonal to the normal of the light-receiving surface (imaging surface) instead of the shift lens. In the following description, the shift lens (second lens unit 102) and the image sensor 6 will be correctively referred to as a shiftable unit.

The focus correction actuator 107 is a voice coil motor that includes a magnet and a coil, and moves the third lens unit 103 through the thrust when the coil is electrified. The focus correction actuator 107 and the lens CPU 109 are also electrically connected by an unillustrated flexible printed substrate. The lens CPU 109 calculates a drive amount for the third lens unit 103 (referred to as a "focus correction drive amount" hereinafter) in accordance with a camera vibration amount, a tilt angle (tilt information) detected by a tilt sensor 38, which will be described later. The controller calculates driving of the focus correction actuator 107 in accordance with the calculation result.

In this embodiment, the focus correction actuator 107 is the voice coil motor, but may be another actuator, such as a stepping motor and a piezoelectric element. This embodiment moves the focus correction lens as part of the imaging optical system, but may move the image sensor 6 along the normal of the light-receiving surface (imaging surface).

The first, second, and third lens holding frames 111, 112, and 113 are attached to a communication ring 22, and the communication ring 22 is fixed onto a linear cylinder 23. A first cam follower 121 provided onto the linear cylinder 23 is engaged with a linear groove portion provided in a guide cylinder 20 and a fourth cam follower 124 provided onto the fourth lens holding frame 114 is engaged with a focus cam groove portion and a fourth lens cam groove provided in the cam cylinder 21. A focus operation ring 24 is manually rotated by a user in manual focusing, and transmits a rotating force to the cam cylinder 21.

As the cam cylinder 21 is rotated via the focus operation ring 24, the first to third lens units 101 to 103 integrally move in the optical axis direction together with the linear cylinder 23 and the communication ring 22. The fourth lens unit 104 moves in the optical axis direction independently of the first to third lens units 101 to 103. The focus operation ring 24, the guide cylinder 20, the cam cylinder 21, the linear cylinder 23, etc. constitute a manual focus mechanism (focusing unit).

The first to third lens units 101 to 103 may be driven by an electric actuator, such as a motor. A rotation amount and a rotation direction of the focus operation ring 24 may be electrically detected, and the actuator configured to drive the cam cylinder 21 may be controlled based on the electric signal.

Next follows a description of a tilt and shift mechanism in the interchangeable lens 2. An whole rotation unit 30 is coupled, rotatably around the optical axis OA, with a fixed member 31 fixed onto a mount 25 connected to the camera 1 and configured to rotate, around the optical axis OA, part (referred to as a "rotatable part" hereinafter) of the interchangeable lens 2 closer to the object than the whole rotation unit 30. A rotation amount (angle) of the rotatable part is detected by the angular sensor 32.

A shift unit 33 is coupled with the whole rotation unit 30 so as to shift in a (shift) direction orthogonal to the optical axis OA, and configured to parallel move, in the shift direction, part (referred to as a "shiftable part" hereinafter) of the interchangeable lens 2 closer to the object than the shift unit 33. The shift part 33 includes a unit configured to convert a rotating operation of an unillustrated shift knob into a force in the shift direction so as to shift the shiftable part. A shift sensor 34 detects a shift amount and a shift direction (longitudinal direction) of the shiftable part.

A TS rotation unit 36 rotates the shift unit 33 and the tilt unit 35 relative to each other (or provides a "TS rotation"). A tilt unit 35 tilts part (referred to as a "tiltable part" hereinafter) of the interchangeable lens 2 closer to the object than the tilt unit 35, around the axis orthogonal to the optical axis OA relative to the shift unit 33 (or the camera 1). More specifically, a concave surface provided to the TS rotation unit 36 and a convex surface provided to the tilt unit 35 are formed as a semi-cylindrical surface having the same center axis (tilt center) and the same radius and contact each other. When the convex surface provided to the tilt unit 35 slides relative to the convex surface provided to the TS rotation unit 36, the tiltable part rotates or tilt in the tilt direction. The tilt unit 35 includes a unit for tilting the tiltable part by converting the rotating operation of a tilt knob 37 into a force in the tilt direction. A tilt sensor 38 detects a tilt amount and a tilt direction (longitudinal direction) of the tiltable part.

The whole rotation unit 30, the shift unit 22, the tilt unit 35, and the TS rotation unit 36 provide a shift and a tilt, singularly or in combination, in any directions. The guide cylinder 20 is fixed onto the tilt unit 35.

When an unillustrated release button is pressed in the camera 1 mounted with the thus configured interchangeable lens 2, the image sensor 6 is exposed and an image is generated and recorded after the autofocus and photometry (exposure determination).

Figure 2A:
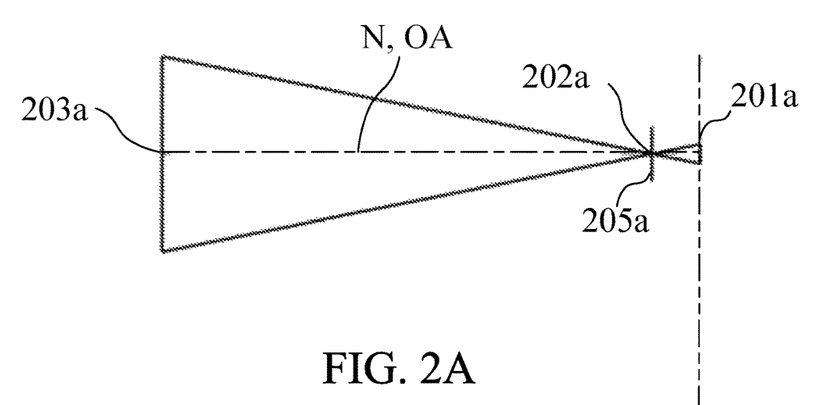
FIGS. 2A and 2B are views for explaining the Scheimpflug principle.
Figure 2B:
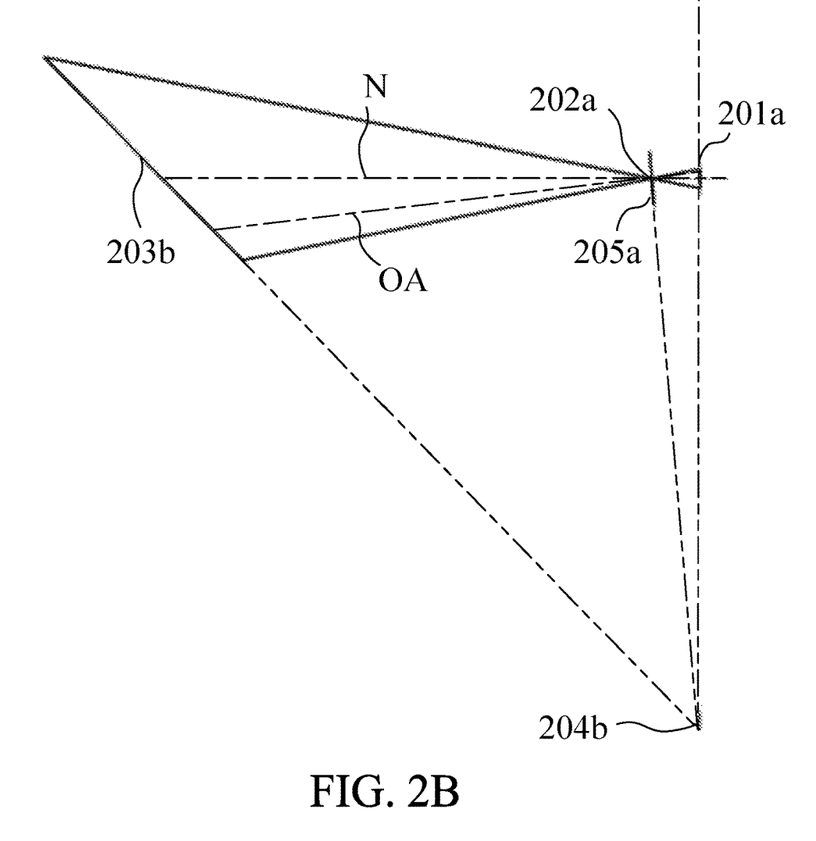

Referring now to FIGS. 2A and 2B, a description will be given of the Scheimpflug principle before the process of the lens CPU 109 is explained. When an optical axis OA in the imaging optical system inclines to a normal of an imaging surface 201a in the interchangeable lens 2 (or when the principal plane 205a in the imaging optical system inclines to the imaging surface 201a), the Scheimpflug principle determines the in-focus range on the object side. FIG. 2A illustrates an in-focus range (object surface) 203a when the optical axis OA in the imaging optical system 202a inclines to the normal N of the imaging surface 201a. FIG. 2B illustrates an in-focus range 203b when the optical axis OA in the imaging optical system 202a inclines to the normal N of the imaging surface 201a.

According to the Scheimpflug principle, when the imaging surface 201a intersects the principal plane 205a in the imaging optical system 202a at an intersection 204b on the same line as illustrated in FIG. 2B, the in-focus object surface 203b also passes the intersection 204b.

When the object to be captured has a depth and the in-focus object surface 203b tilts along the depth, the object can be focused from its front end to its back end. When the deep part is to be focused by the untiltable lens, the stop is generally set to have a narrow aperture so as to deepen the depth of field. On the other hand, the tiltable lens can focus on the object at any positions in the depth direction through tilting even when the stop is fully opened.

The reverse tilt imaging that tilts the principal plane 205a in the imaging optical system 202a in a direction opposite to the tilt direction of the deep object enables the in-focus object surface 203b to intersect at a nearly right angle with respect to a depth direction of the object. In this case, the in-focus range can be extremely narrowed, and a georama image can be obtained.

Figure 3A:
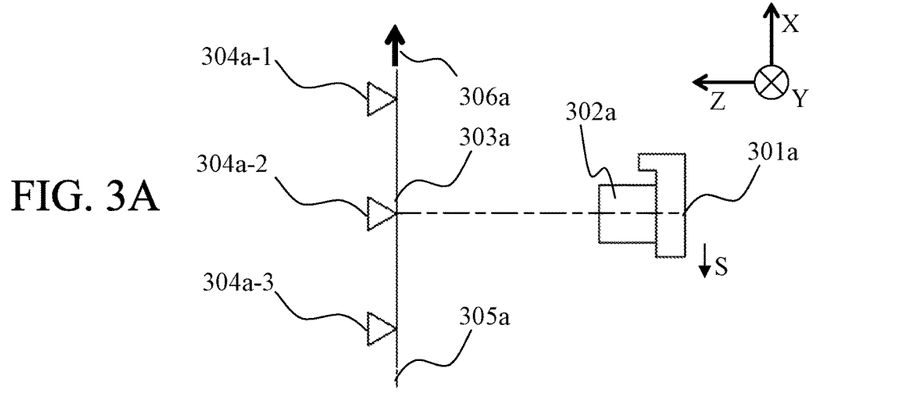
FIGS. 3A to 3C are views of comparison results between normal imaging and tilt imaging regarding a vibration of an interchangeable lens according to the first embodiment and a movement of an imaging surface for an image stabilization.
Figure 3B:
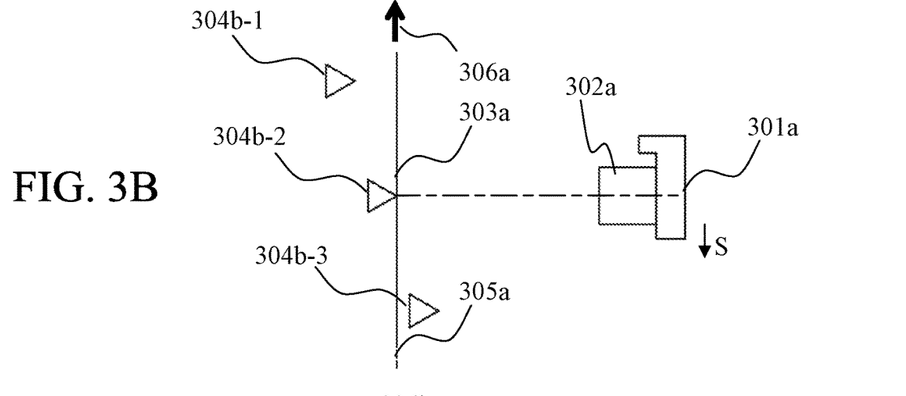
Figure 3C:
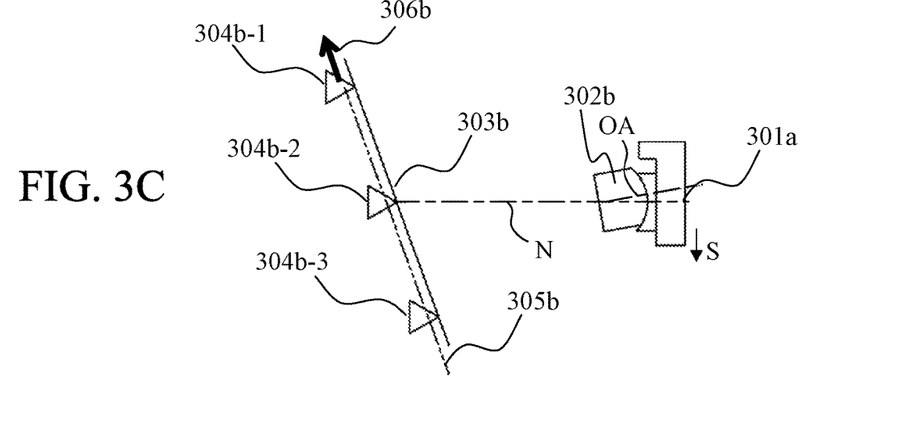

Referring now to FIGS. 3A to 3C, a movement of the object surface etc. will be described when the lens is tiltable and when the lens is untiltable, so as to reduce (correct) an image blur caused by the camera vibration by shifting the second lens unit 102. In FIGS. 3A to 3C, reference numeral 301a denotes an imaging surface, and reference numeral 302a denotes an imaging optical system. Reference numerals 303a and 303b denote in-focus object surfaces. The X, Y, and Z in FIG. 3A to 3C correspond to those in FIG. 1, but the longitudinal direction is the X direction and the direction vertical to the paper plane is the Y direction in FIGS. 3A to 3C.

FIG. 3A illustrates objects 304a-1 to 304a-3 arranged parallel to an imaging surface 301a and captured with non-tilt imaging. FIG. 3B illustrates objects 304b-1 to 304b-3 arranged obliquely to the imaging surface 301a and captured with non-tilt imaging. FIG. 3C illustrates objects 304b-1 to 304b-3 arranged obliquely to the imaging surface 301a and captured with tilt imaging.

Since the oblique objects are captured with non-tilt imaging in FIG. 3B, the in-focus object is only the object 304b-2. In FIGS. 3A and 3C, all of the objects 304a-1 to 304a-3 and 304b-1 to 304b-3 are focused. In these states, FIGS. 3A and 3C illustrate shifts of object surfaces 305a and 305b with a long dashed double-short dashed line when the camera vibration S occurs in the −X direction. In FIGS. 3A and 3B, the object surface 305a shifts parallel to the imaging surface 301a. However, in FIG. 3C, the object surface 305b shifts in a tilt direction rather than the direction parallel to the imaging surface 301a. Although the camera vibration S occurs in the X (−X) direction parallel to the imaging surface 301a by an example, the camera vibration is not limited to the so-called parallel vibration to the X direction and may be an angular vibration caused by the rotation.

When the shiftable unit is shifted in FIG. 3A to 3C, the object surfaces 305a and 305b are shifted along the original object surface. For example, in FIGS. 3A and 3B, the shift lens (second lens unit 102) is shifted in the +X direction on a plane orthogonal to the optical axis OA, the object surface 305a shifts in the arrow 306a or +X direction relative to the imaging surface 301a. The image stabilization is available by making a shift drive amount (absolute value) of the shift lens equal to the object surface 305a.

In FIG. 3C, when the shift lens is shifted, the object surface 305b shifts along the original object surface tilted relative to the imaging surface 301a. The object surface 305b obliquely shifts relative to the imaging surface 301a for the following reasons. Even when the shift lens is shifted on the plane orthogonal to the optical axis OA tilted to the imaging surface 301a, an angle between the principal plane 205a in the imaging optical system and the imaging surface 201a (301a) does not change according to the Scheimpflug principle described with reference to FIG. 2B. The intersection between the imaging plane 201a and the principal plane 205a does not change before and after the shift lens is shifted. Thus, the object surface 305b shifts along the original object surface as the shift lens is shifted.

It is evident from the above description that this is applied to a shift of the image sensor 6 as a shiftable unit parallel to the imaging surface 301a (on a plane orthogonal to the normal of the imaging plane).

When the object surface 305b shifts in the direction tilted to the imaging surface 301a by shifting the shiftable unit as in FIG. 3C, the shift contains a shift component in a focusing direction (normal direction in which the normal of the imaging surface 301a extends). Hence, the defocus occurs. This embodiment instructs the focus correction actuator 107 to move the third lens unit 103 in the optical axis direction as the second lens unit 102 is shifted, so as to reduce the defocus that would occur due to the shift of the shiftable unit in the tilted state.

Similar to FIG. 3C, the objects 304b-1 to 304b-3 are obliquely arranged relative to the imaging surface 301a in FIG. 3B, but the defocus caused by the shift of the shiftable unit does not occur since the object surface 305a is parallel to the imaging surface 301a.

Figure 4:
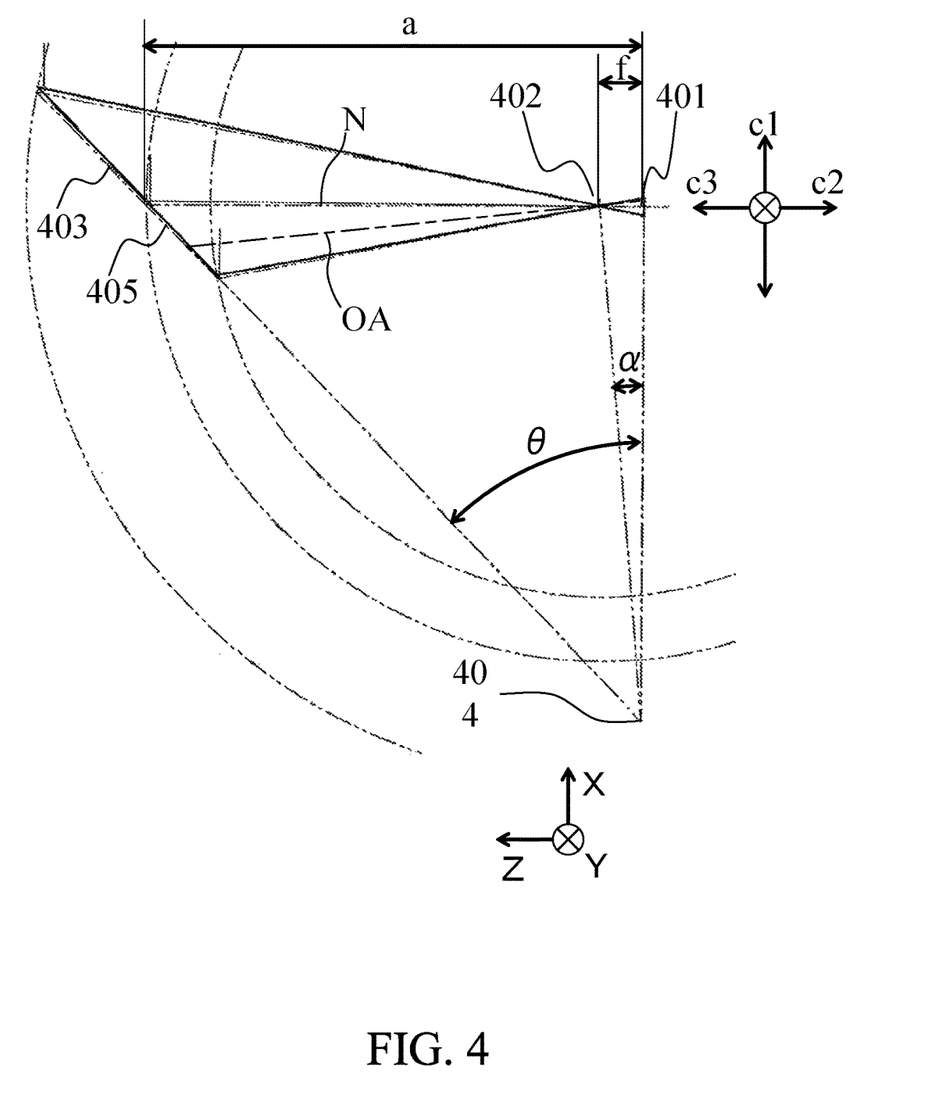
FIG. 4 is a view illustrating a vibration amount in the tilt imaging according to the first embodiment.

Referring now to FIG. 4, a description will be given of a method for correcting the defocus caused by the shift of the shiftable unit (which is herein a shift lens) using the Scheimpflug principle described in FIG. 2B and the numerical expressions. In FIG. 4, reference numeral 401 denotes an imaging surface, and reference numeral 402 denotes a principal plane in the imaging optical system. Reference numeral 403 denotes an in-focus object surface. According to the Scheimpflug principle, when a line extending the imaging surface 401 intersects a line extending the principal plane 402 in the imaging optical system at an intersection 404, the object 403 passes the intersection 404. While X, Y, and Z directions in FIG. 4 correspond to those in FIG. 1, FIG. 4 sets the longitudinal direction to the X direction and the direction perpendicular to the paper plane of FIG. 4 to the Y direction.

In FIG. 4, "f" denotes a focal length of the imaging optical system, "a" denotes an object distance in the normal direction of the imaging surface 401, and "α" denotes a tilt angle to the imaging surface 401 of the principal plane 402 (or the normal of the imaging surface 401 of the optical axis OA in an imaging optical system). Then, an angle θ between the object surface 403 and the imaging surface 401 is expressed as follows:

$$\tan\theta = (a/f)\tan\alpha \quad (1)$$

For example, where f=90 mm, a=1 mm, and α=5 degrees, θ becomes 44 degrees. The tilt angle α is tilt information detected by the tilt sensor 38, and the focal length f is optical information previously stored in the lens CPU 109. The object distance a may be detected by directly detecting the position of each lens in the imaging optical system or indirectly detected (calculated) through a manual focus unit, or measured by an unillustrated focus detection unit.

FIG. 4 illustrates an object surface 405 with a long dashed double-short dashed line when the camera vibrates similar to FIG. 3C. Among the camera vibrations detected by the vibration sensor 110, assume that c1 is a vibration component in a direction in which the tilt unit 35 tilts (X direction in FIG. 4), c2 is a vibration component in a direction (Y direction in FIG. 4) orthogonal to the vibration component c1, and c3 is a vibration component in the normal direction of the imaging surface 401 (Z direction in FIG. 4). Then, a shift amount of the object surface 403 along the original object surface for the image stabilization is defined as follows:

$$X \text{ direction: } c1/\cos\theta \quad (2)$$

$$Y \text{ direction: } c2 \quad (3)$$

$$Z \text{ direction: } c1 \times \tan\theta + c3 \quad (4)$$

Assume that the vibration sensor 110 is an angular velocity sensor. Then, c1 contains a longitudinal-axis rotational vibration (yaw vibration) as a rotation around an upper limit shaft which extends in the longitudinal direction orthogonal to the normal N of the imaging surface 401 detected by the vibration sensor 110, c2 contains a lateral-axis rotational vibration (pitch vibration) as a rotation around a lateral axis which extends in the lateral direction orthogonal to the normal N of the imaging surface 401, and c3 contains a parallel vibration as a vibration parallel to the normal N of the imaging surface 401 detected by the vibration sensor 110.

Next follows a description of a shift drive amount for the shift lens and a focus correction drive amount for the focus correction lens corresponding to the shift amounts of the object surface 403 along the original object surface defined by the expressions (2) to (4). Assume that e1 and e2 are ratios of shift amounts for the object surface 403 along the original object surface to a unit shift drive amount in the direction parallel to the tilt direction of the shift lens and the direction orthogonal to the tilt direction. In addition, e3 is a ratio of a moving amount of the object surface 403 in the normal direction of the imaging surface 401, to a unit focus correction drive amount for the focus correction lens in the optical axis direction. Then, the shift drive amount of the shift lens are expressed as follows:

$$X \text{ direction: } (c1/\cos\theta)/e1 \quad (5)$$

$$Y \text{ direction: } c2/e2 \quad (6)$$

The focus correction drive amount for the focus correction lens is expressed as follows:

$$(c1 \times \tan\theta + c3)/e3 \quad (7)$$

The shift drive amount for the shift lens (expressions (5) and (6)) and the focus correction drive amount for the focus correction lens (expression (7)) can be calculated using the vibration amounts c1 to c3, the tilt angle α, the focal length f and the object distance a of the imaging optical system, and the ratios e1 to e3. The lens CPU 109 performs this calculation.

While this embodiment calculates the shift drive amount for the shift lens and the focus calculation drive amount for the focus correction lens using the expressions (5) to (7), another calculation method may be used. For example, the focus correction drive amount for the focus correction lens to the shift drive amount for the shift lens may be read out of a previously prepared data table. In addition, a parameter different from the above parameters may be used for the calculation.

While the tilt direction is the X direction in this embodiment, the tilt direction may have a component in any one of the X and Y directions due to the configuration that includes the whole rotation unit and the TS rotation unit 36. When the vibration amount detected by the vibration sensor 110 is converted into c1 to c3, the tilt direction may be considered.

Next, the shift drive amount for the shift lens and the focus correction drive amount for the focus correction lens are calculated under the above condition with the focal length f=90 mm, the object distance a=1 mm, and the tilt angle α=5 degrees, and the angle between the imaging surface and the object surface e1=44 degrees. Assume that the camera vibration is an angular vibration of 0.5 degrees around the image sensor 6 in the direction parallel to the tilt direction. Then, c1=8.7 mm, c2=0, and c3=0 are established. Due to the expressions (2) to (4), the shift amount for the object surface along the original object surface for the image stabilization is 12 mm in the direction parallel to the tilt direction, 0 mm in the direction orthogonal to the tilt direction, and 8.4 mm in the normal direction of the imaging surface.

This embodiment sets e1=e2=24 and e3=123. Hence, the shift drive amount for the shift lens is 0.5 mm in the direction parallel to the tilt direction and 0 mm in the direction orthogonal to the tilt direction. The focus correction drive amount for the focus correction lens is 0.068 mm.

Next, the shift drive amount for the shift lens and the focus correction drive amount for the focus correction lens are calculated in the reverse tilt imaging under the condition with the focal length f=90 mm and the object distance a=10. Since the reverse tilt imaging is performed so as to extremely narrow the in-focus range, the tilt angle α is set to 10 degrees by an example. Then, an angle θ between the imaging surface and the object surface is 87 degrees.

Assume that the camera vibration is an angular vibration of 0.5 degrees around the image sensor 6 in the direction parallel to the tilt direction. Then, c1=87 mm, c2=0, and c3=0 are established. Due to the expressions (2) to (4), the shift amount for the object surface along the original object surface for the image stabilization is 1662 mm in the direction parallel to the tilt direction, 0 mm in the direction orthogonal to the tilt direction, and 1660 mm in the normal direction of the imaging surface.

This embodiment sets e1=e2=3324 and e3=12388. Hence, the shift drive amount for the shift lens is 0.5 mm in the direction parallel to the tilt direction and 0 mm in the direction orthogonal to the tilt direction. The focus correction drive amount for the focus correction lens is 0.134 mm.

Figure 5:
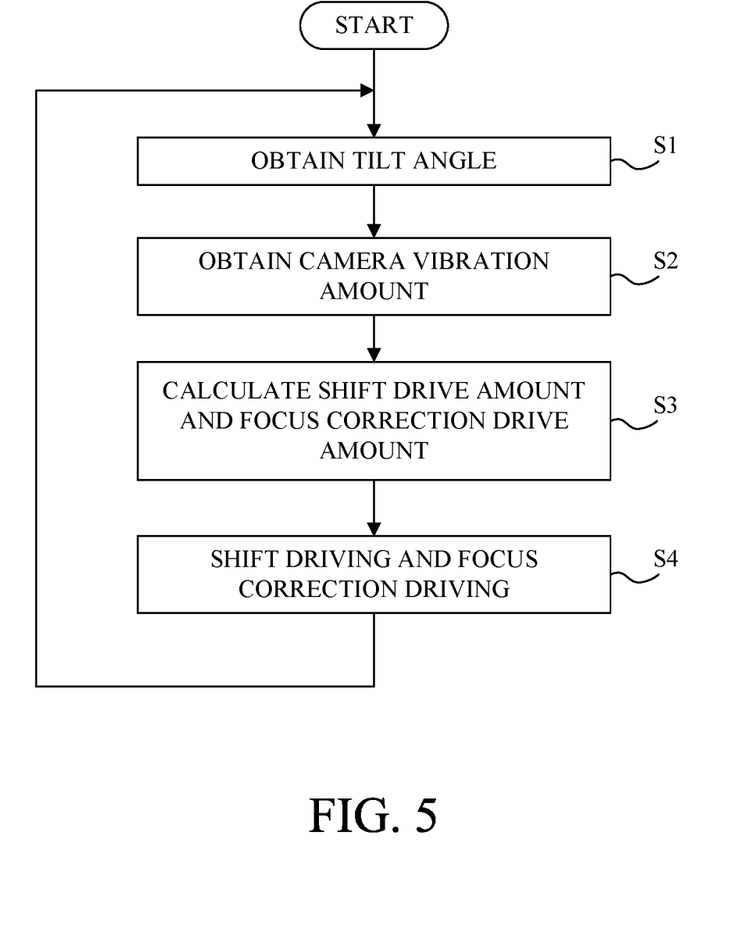
FIG. 5 is a flowchart illustrating a process executed by a lens CPU according to the first embodiment.

The flowchart in FIG. 5 illustrates a process executed by the lens CPU 109. The lens CPU 109 executes this process in accordance with the optical control program as a computer program.

In the step S1, the lens CPU 109 acquires the tilt angle information through the tilt sensor 38, the focal length and information of the in-focus object distance of the imaging optical system.

Next, in the step S2, the lens CPU 109 acquires the camera vibration amount through the vibration sensor 110. In the step S3, the lens CPU 109 calculates the shift drive amount for the shift lens and the focus correction drive amount for the focus correction lens using the above expressions (5) to (7).

In the step S4, the lens CPU 109 controls driving of the vibration-proof actuator 106 so as to shift the shift lens by the shift drive amount calculated in the step S3. Moreover, simultaneously, the lens CPU 109 controls driving of the focus correction actuator 107 for focusing by the focus correction lens by the focus correction drive amount calculated in the step S3. Thereafter, the lens CPU 109 repeats the process from the step S1.

Thus, this embodiment drives the focus correction lens (focus correction unit) associated with the shift of the shift lens (shiftable unit), or controls driving both the shiftable unit and the focus correction unit. This configuration can restrain a defocus which would be caused by shifting the shiftable unit for the image stabilization in the tilt imaging.

This embodiment corrects a defocus caused by the image stabilization using the third lens unit 103 as part of the first to third lens units 101 to 103 or a plurality of lenses movable in the usual focus. However, a lens different from the lens that moves in the usual focus may be used for a focus correction lens. The same lens as the lens that moves in the usual focus may be used as the focus correction lens. In this case, this lens may be driven by the actuator corresponding to the focus correction actuator 107 even in the usual focus.

Since the shift lens and the focus correction lens are simultaneously driven, each of these two actuators configured to drive them (the vibration-proof actuator 106 and the focus correction actuator 107) has an equivalent responsiveness and controllability. Thus, when a heavy lens is driven in the usual focus or when the drive system configured to drive the lens has the significant looseness and inertia, the focus correction lens may use a lens different from the lens for the usual focus. In this case, since the focus correction drive amount for the focus correction lens is smaller than a moving amount of the lens for the usual focus, the focus correction actuator suitable for such a small focus correction drive amount may be selected. This configuration can surely restrain the defocus which would be caused by the shift of the shiftable unit in the tilt imaging.

As described above, this embodiment controls driving of the shiftable unit and the focus correction unit based on the camera vibration amount, the tilt angle, and the object distance, so as to correct the defocus caused by the shift of the shiftable unit. This defocus cannot be fully corrected by the autofocus using the focus detection result in accordance with the focus detection result by the focus detection unit 5 or the imaging surface phase difference detection method and the contrast detection method, because of the following reasons.

As described with reference to FIG. 3C, the object surface tilts to the imaging surface in the tilt imaging, and thus the defocus occurs due to the camera vibration parallel to the imaging surface. As the shift position of the shift lens in the image stabilization always changes, the focus detection result in the autofocus always changes. In other words, the in-focus state is unavailable in the autofocus while the camera vibrates, and it is consequently difficult to correct the defocus caused by the shift of the shiftable unit.

Since the focus detection unit 5 uses the photoelectric conversion unit (such as a line sensor and an image sensor) for the focus detection in accordance with the imaging surface phase difference detection method or the contrast detection method, the focus detection corresponding to the frequency of the camera vibration may be unavailable in a dark scene. On the other hand, this embodiment can surely correct the defocus using the detection result of the camera vibration by the vibration sensor 110 irrespective of the brightness.

Second Embodiment

Figure 6:
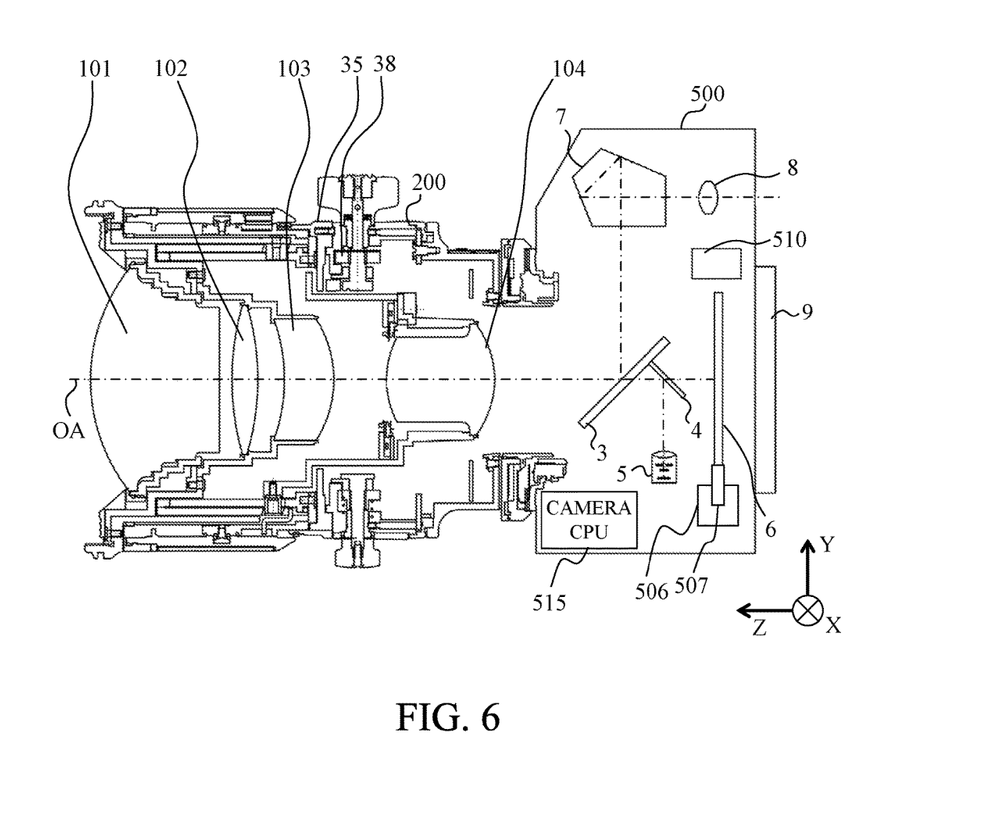
FIG. 6 is a sectional view of a camera according to a second embodiment of the present invention.

FIG. 6 illustrates a single-lens reflex camera 500 (simply referred to as a "camera" hereinafter) as an imaging apparatus and an interchangeable lens 200 detachably attached to the camera 500 according to a second embodiment. In FIG. 6, a Z direction is an optical axis direction along the lens optical axis (simply referred to as an "optical axis" hereinafter), an X direction is a lateral direction in two directions parallel to the imaging surface and orthogonal to the optical axis OA, and a Y direction is a longitudinal direction in the two directions parallel to the imaging surface and orthogonal to the optical axis OA. This embodiment provides the camera 500 with the image sensor 6 as the shiftable unit and the focus correction unit. Those units in FIG. 6, which are corresponding units in the camera 1 and the interchangeable lens 2 according to the first embodiment (FIG. 1), will be designated by the same reference numerals. While a lens interchangeable type imaging apparatus is the optical apparatus that includes the shiftable unit and the focus correction unit in this embodiment, a lens integrated type imaging apparatus may be the optical apparatus.

The camera 500 includes a vibration sensor 510, such as an angular sensor, configured to detect a vibration of the camera 500 (camera vibration amount), and a vibration-proof actuator 506 configured to shift the image sensor 6 as the shiftable unit on the plane orthogonal to the normal of the light-receiving surface (imaging surface). The vibration-proof actuator 506 includes a voice coil motor etc., similar to the vibration-proof actuator 106 in the first embodiment. For the image stabilization, the image sensor 6 may be shifted and rotated around the axis that passes the normal of the imaging surface.

The camera 500 further includes a focus correction actuator 507 configured to drive the image sensor 6 as the focus correction unit in the normal direction of the imaging surface. The focus correction actuator 507 includes a piezoelectric element, deforms in accordance with an input electric signal, and drives the image sensor 6 (although this driving will be referred to as "focus correction driving"). The focus correction actuator 507 may use a voice coil motor and a stepping motor, similar to the focus correction actuator 107 in the first embodiment. The vibration-proof actuator 506 and the focus correction actuator 507 are electrically connected to a camera CPU 515 as the optical control apparatus (acquirer and controller) through unillustrated flexible printed substrates.

The camera CPU 515 calculates the shift drive amount for the image sensor 6 in accordance with the camera vibration amount (vibration information or the vibration amount of the imaging optical system) detected by the vibration sensor 110, and controls driving of the vibration-proof actuator 506 in accordance with the calculation result. The camera CPU 515 calculates a focus correction drive amount for the image sensor 6 in accordance with the camera vibration and the tilt angle (tilt information) detected by the tilt sensor 38 mounted on the interchangeable lens 200, and controls driving of the focus correction actuator 507 in accordance with the calculation result.

The interchangeable lens 200 includes the imaging optical system and a tilt and shift mechanism similar to the interchangeable lens 2 in the first embodiment.

The camera CPU 515 calculates the shift drive amount and the focus correction amount for the image sensor 6 using the vibration amounts c1 to c3, the tilt angle α, and the focal length f and the object distance a of the imaging optical system, similar to the lens CPU 109 in the first embodiment. Since this embodiment shifts the image sensor 6 and moves it for the focus correction, e1, e2, and e3 may have different values in the expressions (5) to (7) in the first embodiment, even when the same imaging optical system as that of the first embodiment is used.

Thus, this embodiment shifts the image sensor 6 as the shiftable unit and drives the image sensor 6 for the focus correction or controls the image sensor 6 so as to provide both the shift drive and focus correction drive simultaneously. This configuration can restrain the defocus which would be caused by the shift of the shiftable unit for image stabilization in the tilt imaging.

This embodiment uses the image sensor for the shiftable unit and the focus correction unit, improving a design freedom of the interchangeable lens 200.

This embodiment calculates the shift drive amount and the focus correction drive amount for the image sensor using the above expressions (5) to (7), but may use another method. For example, the focus correction drive amount corresponding to the shift drive amount for the image sensor may be read out of the previously prepared data table. A parameter different from the above parameter may be used for a calculation.

The first embodiment provides the shiftable unit and the focus correction unit to the interchangeable lens, and the second embodiment provides the shiftable unit and the focus correction unit to the camera. However, the shiftable unit (shift lens) may be provided to the interchangeable lens, and the focus correction unit (image sensor) may be provided to the camera. In this case, the camera CPU may receive information of the shift drive amount for the shift lens from the lens CPU, and calculate the focus correction drive amount for the image sensor for use with the focus correction. The shiftable unit (image sensor) may be provided to the camera, and the focus correction unit (focus correction lens) may be provided to the interchangeable lens. In this case, the lens CPU receives the information of the shift drive amount for the image sensor from the camera CPU, and calculate the focus correction drive amount for the focus correction lens for use with the focus correction.

Both the shiftable unit and the focus correction unit may be provided to each of the camera and to the interchangeable lens. In this case, the shiftable unit and the focus correction unit on the camera side and the interchangeable lens side may be selected in accordance with the camera vibration magnitude and frequency.

Each of the above embodiment can restrain the defocus caused by shifting the shiftable unit so as to reduce the image stabilization in the tilt imaging.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-000943, filed Jan. 6, 2016, which is hereby incorporated by reference herein in its entirety.

What is claimed is:

1. An optical control apparatus comprising:
a tilt acquirer configured to acquire tilt information on an object surface to an imaging surface;
a vibration acquirer configured to acquire vibration information on a vibration of an optical system;
a calculator configured to calculate a shift drive amount to drive a shiftable unit in a direction orthogonal to an optical axis of the optical system or a direction parallel to the imaging surface, and calculate a focus correction amount to drive a focus correction unit in a direction of the optical axis of the optical system or a direction along a normal of the imaging surface, based at least on the tilt information acquired by the tilt acquirer and the vibration information acquired by the vibration acquirer; and
a controller configured to control the shiftable unit based on the shift drive amount calculated by the calculator and control the focus correction unit based on the focus correction amount calculated by the calculator.

2. The optical control apparatus according to claim 1, wherein the calculator calculates the shift drive amount and the focus correction amount by using a focal length of the optical system and an object distance.

3. The optical control apparatus according to claim 1, wherein the controller controls the driving of the shiftable unit in accordance with the vibration information on the vibration of the optical system.

4. The optical control apparatus according to claim 1,
wherein the shiftable unit is one of a shift lens included in the optical system and an image sensor disposed on an imaging surface, and
wherein the focus correction unit is one of a focus correction lens included in the optical system and the image sensor.

5. The optical control apparatus according to claim 4, wherein the controller controls a focus correction actuator in an optical apparatus that includes the optical system, the focus correction actuator configured to drive the focus correction lens, and a focus controller configured to move a plurality of lenses including the focus correction lens for focusing along the optical axis.

6. The optical control apparatus according to claim 1, wherein the focus correction unit is movable along the optical axis, and the shiftable unit is shiftable in the direction orthogonal to the optical axis.

7. The optical control apparatus according to claim 1, wherein the tilt information is angle information obtained from an angle between the normal of the imaging surface and the optical axis of the optical system.

8. The optical control apparatus according to claim 1, wherein the calculator calculates the focus correction amount of the focus correction unit while adding the shift drive amount of the shiftable unit.

9. The optical control apparatus according to claim 1, wherein the controller simultaneously controls the shiftable unit based on the shift drive amount calculated by the calculator and controls the focus correction unit based on the focus correction amount calculated by the calculator.

10. An optical apparatus comprising:
an optical system;
a tilt acquirer configured to acquirer tilt information of an object surface to an imaging surface;
a vibration acquirer configured to acquirer vibration information;
a shiftable unit which is movable in a direction orthogonal to an optical axis of the optical system or a direction parallel to the imaging surface;
a focus correction unit which is movable in a direction of the optical axis of the optical system or a direction along a normal of the imaging surface;
a calculator configured to calculate a shift drive amount to drive the shiftable unit in the direction orthogonal to the optical axis of the optical system or the direction parallel to the imaging surface, and calculate a focus correction amount to drive the focus correction unit in a direction of the optical axis of the optical system or the direction along the normal of the imaging surface, based at least on the tilt information acquired by the tilt acquirer and the vibration information acquired by the vibration acquirer; and
a controller configured to control the shiftable unit based on the shift drive amount calculated by the calculator and control the focus correction unit based on the focus correction amount calculated by the calculator.

11. A non-transitory computer-readable storage medium configured to store an optical control program, the optical control program comprising the steps of:
acquiring tilt information on an object surface to an imaging surface;
acquiring vibration information on a vibration of an optical system;
calculating a shift drive amount to drive a shiftable unit in a direction orthogonal to an optical axis of the optical system or a direction parallel to the imaging surface, and calculate a focus correction amount to drive the focus correction unit in a direction of the optical axis of the optical system or a direction along a normal of the imaging surface, based at least on the tilt information and the vibration information; and
controlling the shiftable unit based on the shift drive amount calculated by the calculating step and the focus correction unit based on the focus correction amount calculated by the calculating step.

* * * * *